United States Patent
Niinuma

(10) Patent No.: US 10,410,051 B2
(45) Date of Patent: Sep. 10, 2019

(54) METHOD OF EXTRACTING A REGION IN A DISTANCE IMAGE, STORAGE MEDIUM, AND HEAD MOUNTED DISPLAY APPARATUS

(71) Applicant: FUJITSU LIMITED, Kawasaki-shi, Kanagawa (JP)

(72) Inventor: Koichiro Niinuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 333 days.

(21) Appl. No.: 15/349,488

(22) Filed: Nov. 11, 2016

(65) Prior Publication Data

US 2017/0154215 A1    Jun. 1, 2017

(30) Foreign Application Priority Data

Nov. 30, 2015    (JP) .................................. 2015-232628

(51) Int. Cl.
*G06K 9/00* (2006.01)
*G02B 27/01* (2006.01)
(Continued)

(52) U.S. Cl.
CPC ....... *G06K 9/00382* (2013.01); *G02B 27/017* (2013.01); *G06K 9/00389* (2013.01);
(Continued)

(58) Field of Classification Search
None
See application file for complete search history.

(56) References Cited

U.S. PATENT DOCUMENTS

| 2013/0094705 A1 | 4/2013 | Tyagi et al. |
| 2014/0254919 A1* | 9/2014 | Sun ...................... G06K 9/3233 382/154 |

FOREIGN PATENT DOCUMENTS

| JP | 5-165976 A | 7/1993 |
| JP | 2011-128756 A | 6/2011 |

(Continued)

OTHER PUBLICATIONS

Felzenszwalb et al., "Efficient Graph-Based Image Segmentation", International Journal of Computer Vision, vol. 59, No. 2, pp. 1-26, Sep. 2004 (26 pages).

(Continued)

*Primary Examiner* — Chan S Park
*Assistant Examiner* — Elisa M Rice
(74) *Attorney, Agent, or Firm* — Fujitsu Patent Center

(57) ABSTRACT

A method of extracting a region in a distance image including pixels, the method includes: for each of adjacent pixel pairs in the distance image, generating a third pixel group that includes a first pixel group to which a first pixel belongs and a second pixel group to which a second pixel belongs based on a difference between pixel values of the first pixel and the second pixel included in the adjacent pixel pair; dividing the distance image into regions by determining whether to generate a third region represented by the third pixel group by merging a first region represented by the first pixel group and a second region represented by the second pixel group, based on a positional relationship of points represented by pixels included in the third pixel group; and selecting a region that satisfies a predetermined condition from among the regions.

20 Claims, 13 Drawing Sheets

(51) Int. Cl.
*G06K 9/20* (2006.01)
*G06K 9/62* (2006.01)
*G06T 11/60* (2006.01)
*G06K 9/34* (2006.01)
*G06T 7/11* (2017.01)
*G06T 7/187* (2017.01)
*G06T 5/00* (2006.01)

(52) U.S. Cl.
CPC ............ *G06K 9/209* (2013.01); *G06K 9/342* (2013.01); *G06K 9/6232* (2013.01); *G06T 7/11* (2017.01); *G06T 7/187* (2017.01); *G06T 11/60* (2013.01); *G02B 2027/014* (2013.01); *G02B 2027/0138* (2013.01); *G02B 2027/0187* (2013.01); *G06T 5/002* (2013.01); *G06T 2207/10024* (2013.01); *G06T 2207/10028* (2013.01); *G06T 2207/20221* (2013.01); *G06T 2207/30196* (2013.01)

(56) References Cited

FOREIGN PATENT DOCUMENTS

| | | |
|---|---|---|
| JP | 2013-74303 A | 4/2013 |
| JP | 2013-117772 A | 6/2013 |
| JP | 2014-182442 | 9/2014 |
| JP | 2014-238828 | 12/2014 |
| JP | 2015-501578 A | 1/2015 |
| JP | 2015-114762 | 6/2015 |

OTHER PUBLICATIONS

Masuda, "Shape reconstruction technology based on laser measurement data", Kanrin, Journal of The Japan Society of Naval Architects and Ocean Engineers, vol. 40, Jan. 2012 (8 pages), with partial English translation.

Iinuma et al., "High-speed algorithm for plane detection using 3D Hough Transform", Transactions of 2013 Spring Meeting of The Japan Society for Precision Engineering, pp. 877-878 (8 pages), with English abstract and partial English translation.

Trevor et al., "Efficient Organized Point Cloud Segmentation with Connected Components", Semantic Perception Mapping and Exploration, May 2013 (6 pages).

Bhuyan et al., "Fingertip Detection for Hand Pose Recognition", International Journal on Computer Science and Engineering, vol. 4, No. 3, pp. 501-511, Mar. 2012 (12 pages).

Jang et al., "3D Finger CAPE: Clicking Action and Position Estimation under Self-Occlusions in Egocentric Viewpoint", IEEE Transactions on Visualization and Computer Graphics, vol. 21, No. 4, pp. 501-510, Apr. 2015 (10 pages).

Japanese Office Action dated Jun. 18, 2019 for corresponding Japanese Patent Application No. 2015-232628, with English Translation, 9 pages.

* cited by examiner

FIG. 5

| 1/9 | 1/9 | 1/9 |
|-----|-----|-----|
| 1/9 | 1/9 | 1/9 |
| 1/9 | 1/9 | 1/9 |

METHOD OF EXTRACTING A REGION IN A DISTANCE IMAGE, STORAGE MEDIUM, AND HEAD MOUNTED DISPLAY APPARATUS

CROSS-REFERENCE TO RELATED APPLICATION

This application is based upon and claims the benefit of priority of the prior Japanese Patent Application No. 2015-232628, filed on Nov. 30, 2015, the entire contents of which are incorporated herein by reference.

FIELD

The embodiment discussed herein is related to a method of extracting a region in a distance image, a storage medium, and a head mounted display apparatus.

BACKGROUND

In recent years, an augmented reality technology that performs display by adding visual information to a movie captured by a camera has been developed. An information processing apparatus such as a wearable apparatus or a tablet terminal is used in the augmented reality technology, and a head mounted display (HMD) apparatus provided with a camera is used as the wearable apparatus. Information related to an object that is present in a field of view of a user is displayed on a screen of such an information processing apparatus so as to correspond to a position of the object.

It is possible to support a work, such as maintenance checkup and machine installation in a plant, of a user by using such an augmented reality technology. Since the user performs work with their both hands in many cases, an HMD apparatus that the user can wear on their head is more suitable for supporting the user work than a tablet terminal.

Gestures including interaction with an object are used as a method of operating the HMD apparatus in some cases. As for such operations by gestures, the HMD apparatus detects that a specific operation has been performed by recognizing motion of user's hands in an image. In such a case, it is important to precisely extract a hand region from the image in order to recognize the motion of the hands.

Technologies of extracting hand regions by using distance images and various technologies related to division of image regions, plane detection, and fingertip detection are known.

As examples of related art, Japanese Laid-open Patent Publication Nos. 2014-238828, 2015-114762, and 2014-182442, Felzenszwalb et al., "Efficient Graph-Based Image Segmentation", International Journal of Computer Vision, Vol. 59, No. 2, September 2004, Hiroshi Masuda, "Shape reconstruction technology based on laser measurement data", Kanrin, Journal of The Japan Society of Naval Architects and Ocean Engineers, Vol. 40, January 2012, Hiroaki Iinuma et al., "High-speed algorithm for plane detection using 3D Hough Transform", Transactions of 2013 Spring Meeting of The Japan Society for Precision Engineering, 2013, Trevor et al., "Efficient Organized Point Cloud Segmentation with Connected Components", Semantic Perception Mapping and Exploration, May 2013, Bhuyan et al., "Fingertip Detection for Hand Pose Recognition", International Journal on Computer Science and Engineering, Vol. 4, No. 3, March 2012, and Jang et al., "3D Finger CAPE: Clicking Action and Position Estimation under Self-Occlusions in Egocentric Viewpoint", IEEE Transactions on Visualization and Computer Graphics, Vol. 21, No. 4, April 2015 are known.

SUMMARY

According to an aspect of the invention, a method of extracting a region in a distance image including a plurality of pixels, a pixel value of each of the plurality of pixels representing a distance, the method includes: for each of a plurality of adjacent pixel pairs in the distance image, generating a third pixel group that includes a first pixel group to which a first pixel belongs and a second pixel group to which a second pixel belongs based on a difference between pixel values of the first pixel and the second pixel included in the adjacent pixel pair; dividing, by a processor, the distance image into a plurality of regions by determining whether to generate a third region represented by the third pixel group by merging a first region in the distance image represented by the first pixel group and a second region in the distance image represented by the second pixel group, based on a positional relationship of a plurality of points represented by a plurality of pixels included in the third pixel group; and selecting a region that satisfies a predetermined condition from among the plurality of regions.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a smoothing filter;

DESCRIPTION OF EMBODIMENT

Since pixel values of the respective pixels in a distance image represent distances from a distance image sensor to an object, a region configured of short-distance pixels with pixel values that are smaller than a threshold value from among pixels in the distance image may be extracted as a hand region under a situation where no other objects are present near user's hands. However, an appropriate threshold value is not set, and the hand region may not be necessarily extracted under a situation where other objects are present near the hands, for example, in a case where the hands are in contact with a wall.

If a camera and a background are fixed, the hand region can be extracted by using a difference between backgrounds of distance images at two clock times. However, since the position of the object as a background varies in the distance image in a case where the camera moves along with the user, for example, in a case of using an HMD apparatus, it is difficult to extract the hand region by using the difference between backgrounds.

Such a problem occurs not only in the case of extracting the hand region from the distance image for operating the HMD apparatus but also in a case of extracting a predetermined region from a distance image for other image processing.

According to an aspect, an object of the disclosure is to extract a region as an extraction target from a distance image even under a situation where other objects are present near the extraction target.

Hereinafter, detailed description will be given of the embodiment with reference to drawings.

Figure 1:
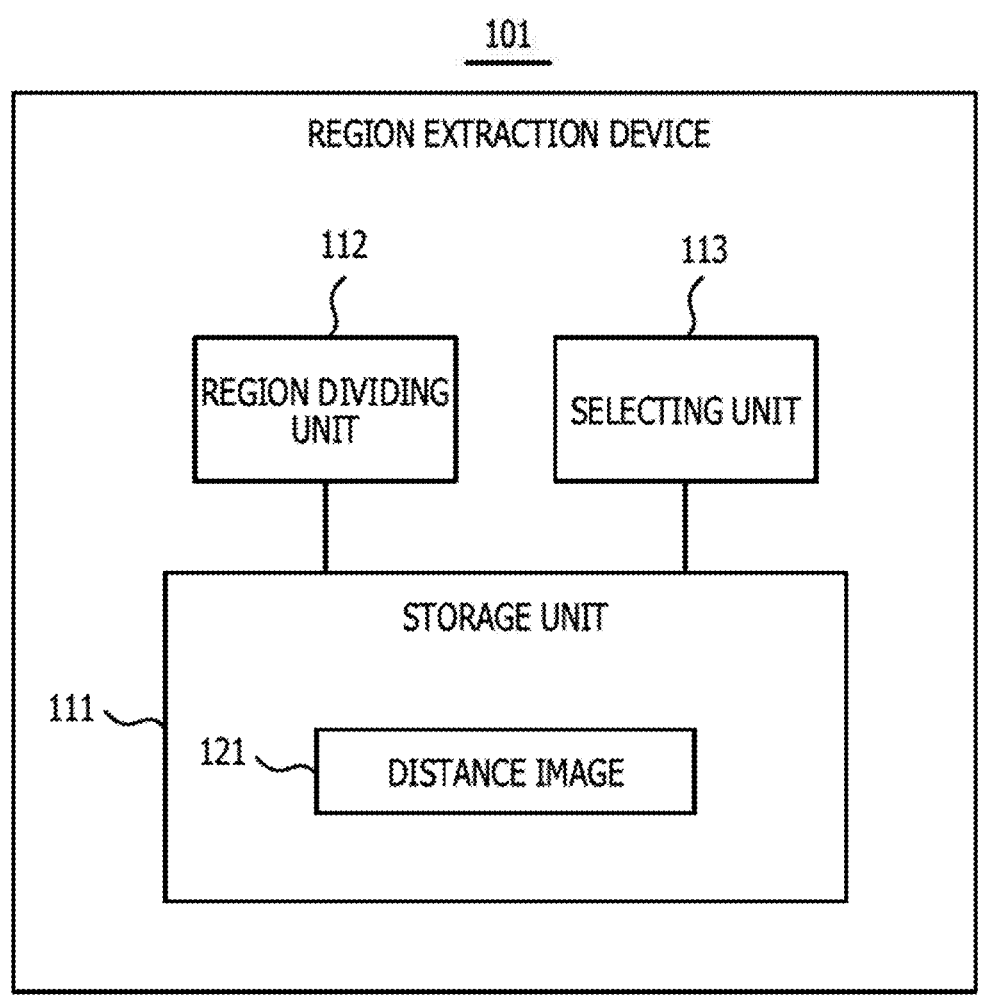
FIG. 1 is a functional configuration diagram of a region extraction device.

FIG. 1 illustrates a functional configuration example of a region extraction device. A region extraction device 101 illustrated in FIG. 1 includes a storage unit 111, a region dividing unit 112, and a selecting unit 113. The storage unit 111 stores a distance image 121, and the region dividing unit 112 divides the distance image 121 into a plurality of regions. The selecting unit 113 selects a region that satisfies a predetermined condition from among the plurality of regions generated by the region dividing unit 112.

Figure 2:
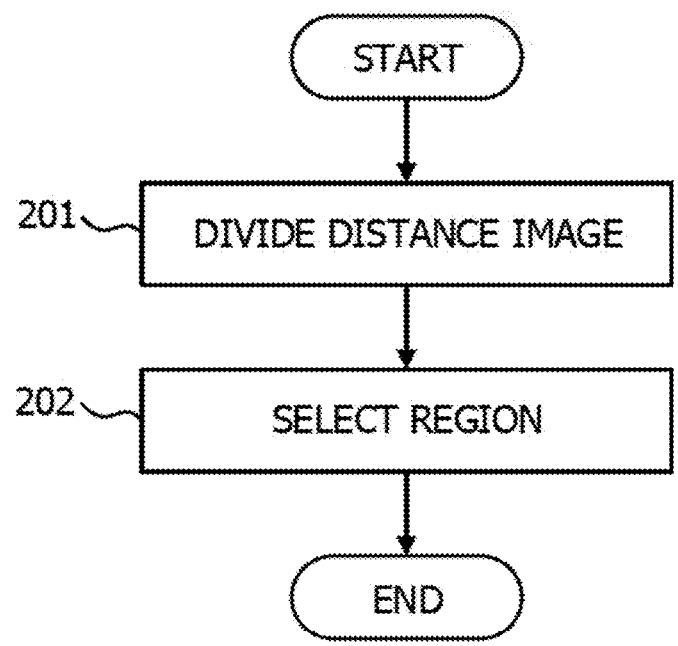
FIG. 2 is a flowchart of region extraction processing.

FIG. 2 is a flowchart illustrating an example of region extraction processing performed by the region extraction device 101 illustrated in FIG. 1. First, the region dividing unit 112 divides the distance image 121 into a plurality of regions by performing the following processing on each of the plurality of adjacent pixel pairs in the distance image 121 (Step 201).

(1) The region dividing unit 112 generates a third pixel group including a first pixel group to which a first pixel belongs and a second pixel group to which a second pixel belongs based on a difference between pixel values of the first pixel and the second pixel included in an adjacent pixel pair.

(2) The region dividing unit 112 determines whether to generate a third region represented by the third pixel group by merging a first region represented by the first pixel group and a second region represented by a second pixel group based on a positional relationship of a plurality of points represented by the plurality of respective pixels included in the third pixel group.

Next, the selecting unit 113 selects a region that satisfies a predetermined condition from among the plurality of regions generated by the region dividing unit 112 (Step 202).

According to the region extraction device 101 illustrated in FIG. 1, a region representing an extraction target is extracted from the distance image even under a situation where other objects are present near the extraction target.

Figure 3:
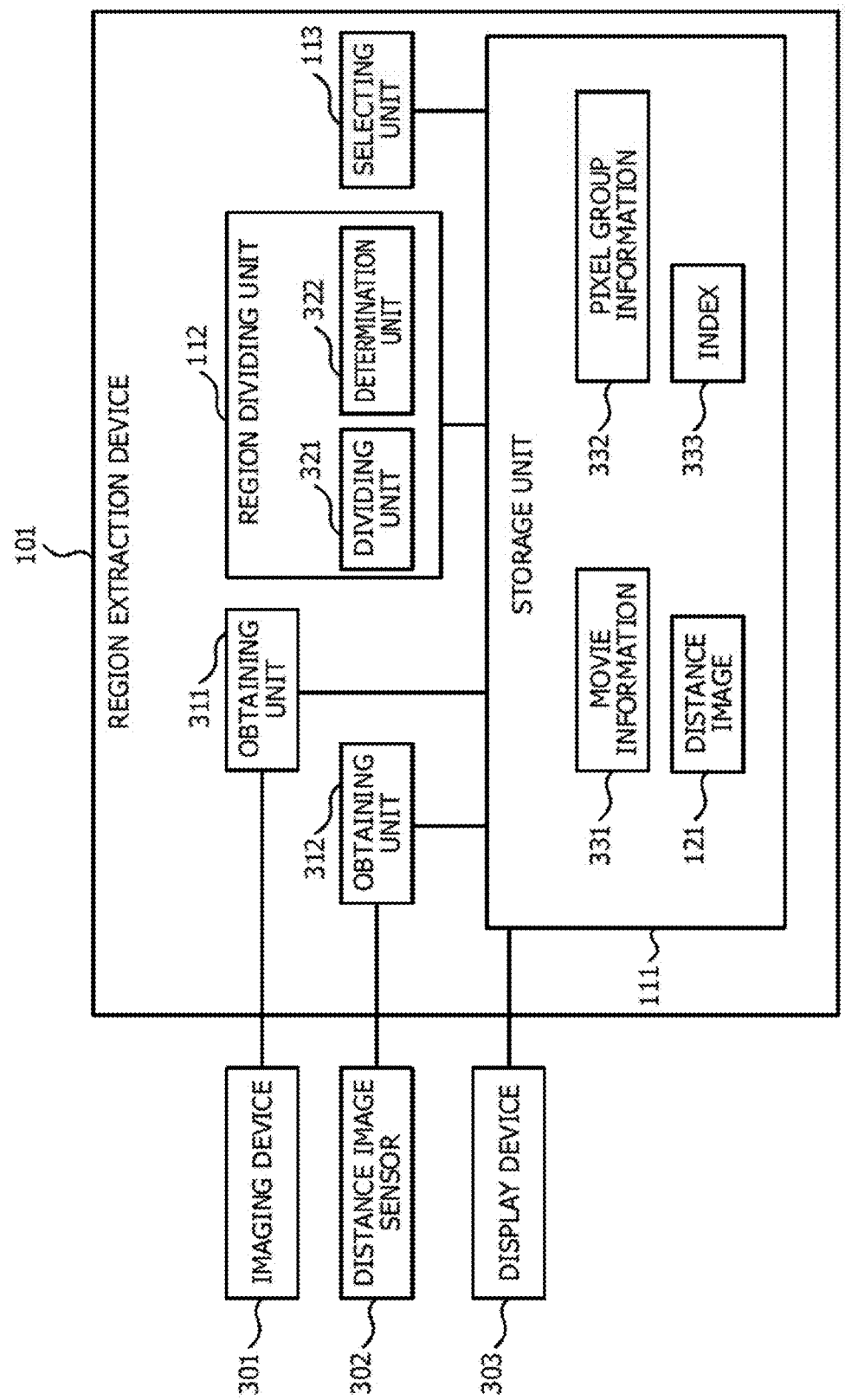
FIG. 3 is a functional configuration diagram of an HMD apparatus.

FIG. 3 illustrates a configuration example of an HMD apparatus that includes a region extraction device 101 illustrated in FIG. 1. The HMD apparatus illustrated in FIG. 3 includes the region extraction device 101, an imaging device 301, a distance image sensor 302, and a display device 303. The region extraction device 101 includes the storage unit 111, the region dividing unit 112, the selecting unit 113, an obtaining unit 311, and an obtaining unit 312, and the region dividing unit 112 includes a dividing unit 321 and a determination unit 322.

The storage unit 111 stores the distance image 121, movie information 331, pixel group information 332, and an index 333. The distance image 121 is captured by the distance image sensor 302, and a pixel value of each pixel in the distance image 121 represents a distance from the distance image sensor 302 to an object. A pixel value representing a distance from a predetermined reference point to the object may be used instead of the distance from the distance image sensor 302 to the object. The distance image 121 may also be referred to as a depth map.

The movie information 331 represents a movie captured by the imaging device 301 and includes frame images at a plurality of clock times. The pixel group information 332 represents a pixel group corresponding to each of the plurality of regions generated by the dividing of the regions in the distance image 121. The index 333 is information indicating likelihood of a hand in each region.

In a maintenance checkup work in a plant, for example, a user checks measurement values displayed by various kinds of measurement equipment such as a power meter, a pressure meter, and a thermometer. Then, the user performs an operation of inputting the result of checking to the HMD apparatus or inputting the measurement values or images of the measurement equipment to the HMD apparatus by a gesture.

The imaging device 301 is a camera that captures a color movie, for example, and captures a movie of a work region. The obtaining unit 311 obtains the movie from the imaging device 301 and stores the movie as the movie information 331 in the storage unit 111. The distance image sensor 302 captures the distance image 121 at each time clock by using a laser beam, an infrared ray, or the like. The obtaining unit 312 obtains the distance image 121 from the distance image sensor 302 and stores the distance image 121 in the storage unit 111. The display device 303 displays the movie information 331 on a screen.

The dividing unit 321 extracts two adjacent pixels as an adjacent pixel pair from the distance image 121, and in a case where a difference between the respective pixel values of the adjacent pixel pair is smaller than a threshold value, the dividing unit 321 merges pixel groups to which the respective pixels belong. The determination unit 322 obtains the index 333 indicating likelihood of a hand in a region represented by a pixel group that is generated by merging, and determines whether or not the region likely corresponds to the hand based on the obtained index 333.

In a case where the determination unit 322 determines that the region likely corresponds to the hand, the dividing unit 321 deletes two pixel groups before the merging from the pixel group information 332 and newly adds the pixel group after the merging to the pixel group information 332. In contrast, in a case where the determination unit 322 determines that the region does not likely correspond to the hand, the dividing unit 321 leaves the two pixel groups before the merging in the pixel group information 332 and does not add the pixel group after the merging to the pixel group information 332.

After the distance image 121 completes the dividing of the region, the selecting unit 113 selects a hand region from among the plurality of regions that respectively correspond to the plurality of pixel groups represented by the pixel group information 332.

A head mount module attached to a head of the user may include the entire HMD apparatus illustrated in FIG. 3 or may include only partial components in the HMD apparatus. For example, the imaging device 301, the distance image sensor 302, and the display device 303 may be mounted as the head mount module while the region extraction device 101 may be mounted as a module that is attached to a body part other than the head.

Figure 4:
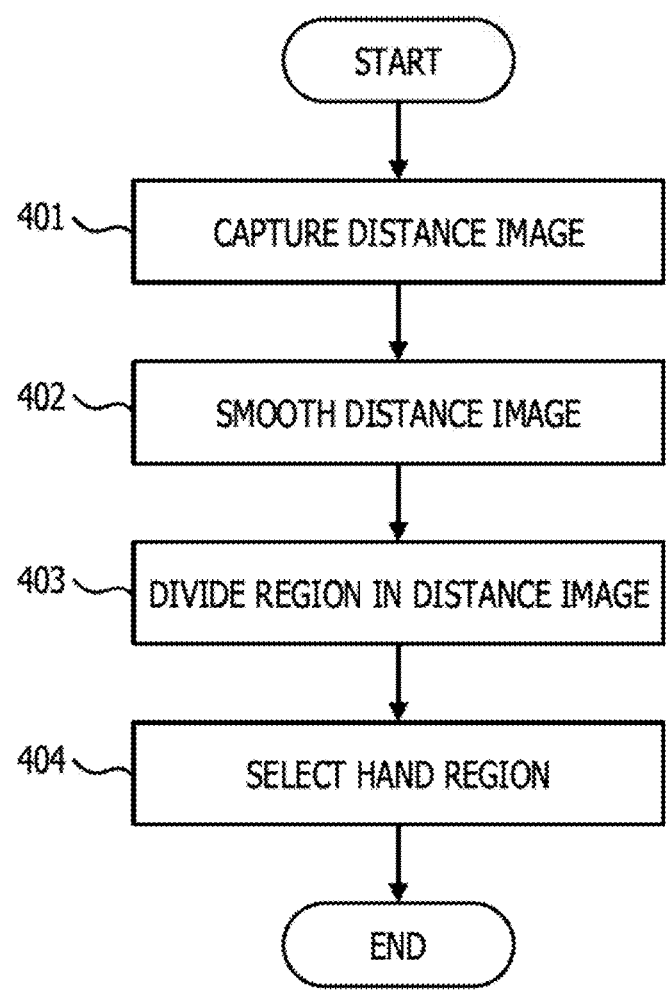
FIG. 4 is a flowchart illustrating an example of the region extraction processing.

FIG. 4 is a flowchart illustrating an example of region extraction processing performed by the region extraction device 101 illustrated in FIG. 3. First, the distance image sensor 302 captures the distance image 121 at a current clock time, and the obtaining unit 312 stores the captured distance image 121 in the storage unit 111 (Step 401). Then, the dividing unit 321 smoothes the region in the distance image 121 by using a smoothing filter or the like (Step 402).

Figure 5:
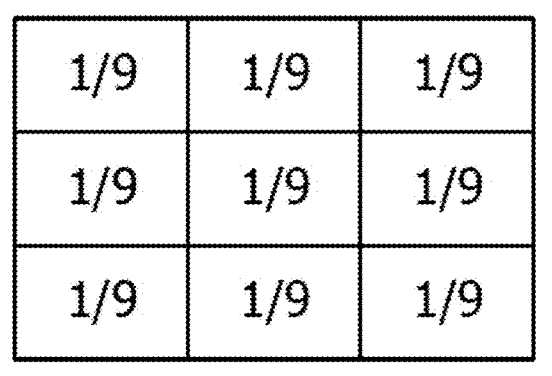

FIG. 5 illustrates an example of the smoothing filter. The smoothing filter illustrated in FIG. 5 is a 3 pixels×3 pixels filter, and a pixel value of the center pixel is replaced with a result of adding values obtained by multiplying the respective pixel values of nine pixels in the filter by a weight ⅑. Noise in the distance image 121 is reduced by performing such weighted addition on all the pixels in the distance image 121.

Next, the dividing unit 321 divides the region in the distance image 121 by using a local feature between adjacent pixels in the smoothed distance image 121 and a comprehensive feature of the shape of the region formed of the plurality of pixels (Step 403). Then, the selecting unit 113 selects a hand region from among the plurality of regions generated by dividing the region (Step 404).

Figure 6:
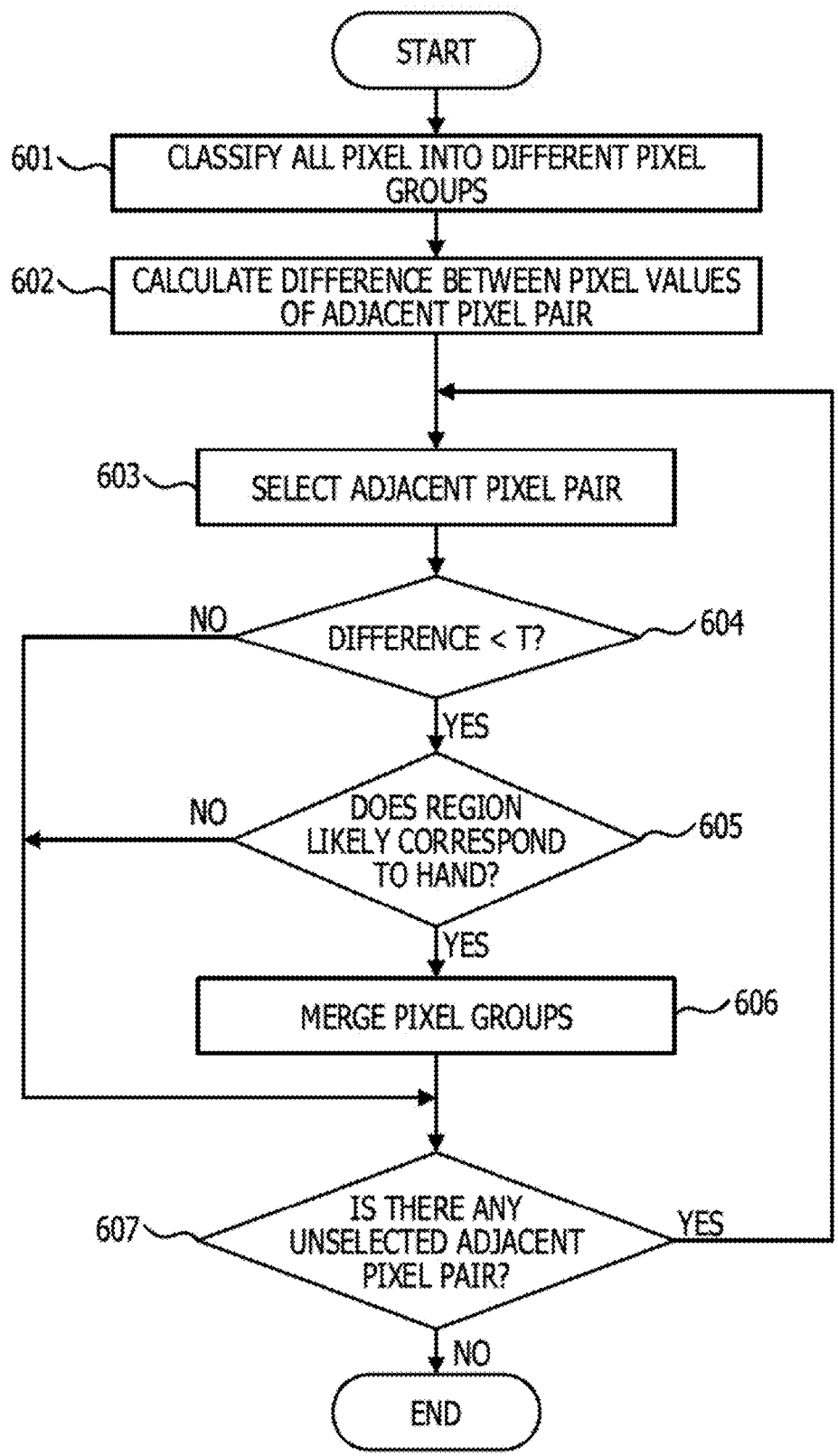
FIG. 6 is a flowchart of region dividing processing.

FIG. 6 is a flowchart illustrating an example of the region dividing processing performed in Step 403 in FIG. 4. In the region dividing processing, pixels of adjacent pixel pairs are merged in the same pixel group in an order from an adjacent pixel pair in which a difference between pixel values of the two pixels is the smallest.

In a case where the difference between the pixel values in the distance image 121 is small, the two pixels are considered to represent two points that are located at a short distance from each other in a three-dimensional space. A plurality of pixels that have already been merged in the same pixel group are also considered to represent a plurality of points that are located at short distances from each other. Thus, two pixel groups to which the respective pixels belong are merged when each adjacent pixel pair is merged.

At this time, the likelihood of a hand, which is a comprehensive feature of the region represented by the pixel group after the merging, is evaluated instead of using only the difference between the pixel values as a local feature. In a case where the likelihood of a hand is determined, the pixel group after the merging is employed. The evaluation of the likelihood of a hand is performed based on the three-dimensional shape and the contour shape of the region, for example.

First, the dividing unit 321 generates the pixel group information 332 obtained by classifying all the pixels in the distance image 121 into different pixel groups and stores the pixel group information 332 in the storage unit 111 (Step 601). Then, the dividing unit 321 generates all combinations of two adjacent pixels in the distance image 121 as adjacent pixel pairs and calculates difference between the pixel values of the respective adjacent pixel pairs (Step 602).

Next, the dividing unit 321 selects an adjacent pixel pair with the smallest difference from among unselected adjacent pixel pairs (Step 603) and compares the difference between the pixel values of the selected adjacent pixel pair with a threshold value T (Step 604). In a case where the difference between the pixel values is smaller than the threshold value T (YES in Step 604), the determination unit 322 checks whether or not the region generated when the two pixel groups of the adjacent pixel pairs are merged likely corresponds to the hand (Step 605).

In a case where the region after the merging likely corresponds to the hand (YES in Step 605), the dividing unit 321 merges the two pixel groups to which the respective pixels in the selected adjacent pixel pair belong (Step 606). Then, the dividing unit 321 deletes the two pixel groups before the merging from the pixel group information 332 and adds the pixel group after the merging to the pixel group information 332. In doing so, the regions represented by the two pixel groups before the merging are merged, and the region represented by the pixel group after the merging is generated.

Next, the dividing unit 321 checks whether or not unselected adjacent pixel pairs remain (Step 607), and in a case where unselected adjacent pixel pairs remain (YES in Step 607), the dividing unit 321 repeats the processing in Step 603 and the following steps.

In contrast, in a case where the difference between the pixel values is equal to or greater than the threshold value T (NO in Step 604), or in a case where the region after the merging does not likely correspond to the hand (NO in Step 605), the dividing unit 321 performs the processing in Step 607 and the following steps without merging the two pixel groups. In a case where no unselected adjacent pixel pairs remain (NO in Step 607), the dividing unit 321 completes the processing.

Figure 7:
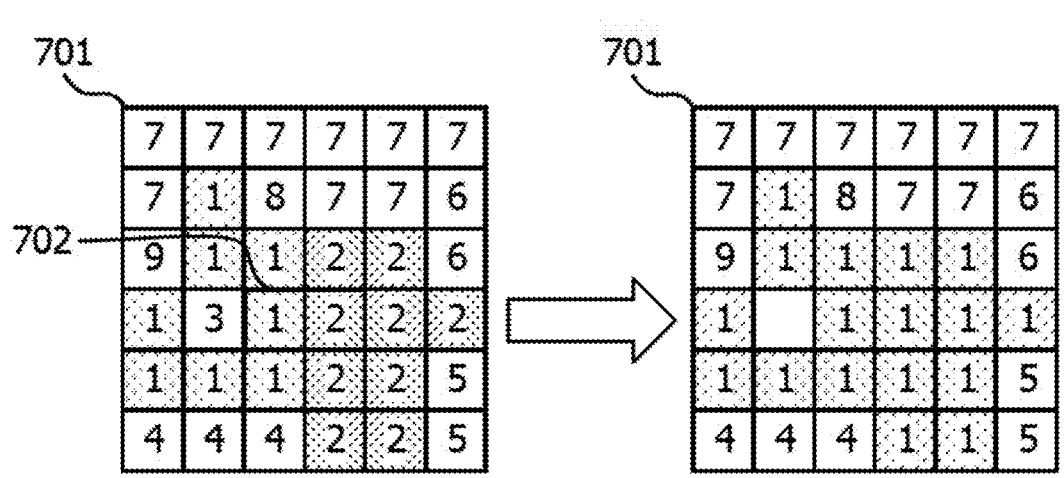
FIG. 7 illustrates merge processing of two pixel groups.

FIG. 7 illustrates an example of merging processing of two pixel groups. Numbers assigned to the respective pixels in a distance image 701 represents group numbers of pixel groups to which the pixels belongs. In a case where a difference between pixel values of an adjacent pixel pair 702 is smaller than the threshold value T, it is checked whether or not a region obtained by merging a pixel group with a group number "1" and a pixel group with a group number "2" likely corresponds to a hand. In a case where the region likely corresponds to the hand, these pixel groups are merged by changing the group number "2" of one pixel group before the merging to the group number "1" of the other pixel group.

The threshold value T used in Step 604 may be a fixed value or may be changed in accordance with the number of pixels in the pixel groups to which the respective pixels of the selected adjacent pixel pairs belong. In a case of using region dividing processing disclosed in the aforementioned related art document "Efficient Graph-Based Image Segmentation", for example, the threshold value T is set by the following equation.

$$T = T0 + k/N \qquad (1)$$

T0 and k in Equation (1) are positive fixed numbers, and N represents a larger value in the number of pixels in the pixel groups to which the respective pixels of the adjacent pixel pair belongs. If it is assumed that the numbers of pixels in pixel groups to which a pixel a and a pixel b belong are Na and Nb, respectively, for example, N is obtained by the following equation.

$$N = \max(Na, Nb) \qquad (2)$$

The threshold value T in Equation (1) decreases as N increases, and increases as N decreases. Therefore, the merging of the pixel groups are promoted by setting a large threshold value T when the regions to which the respective pixels in the adjacent pixel pair belong are small. In contrast, if a region to which any pixel in adjacent pixel pair belongs becomes larger, it is possible to more strictly set the determination criterion for merging by setting a small threshold value T.

Figure 8:
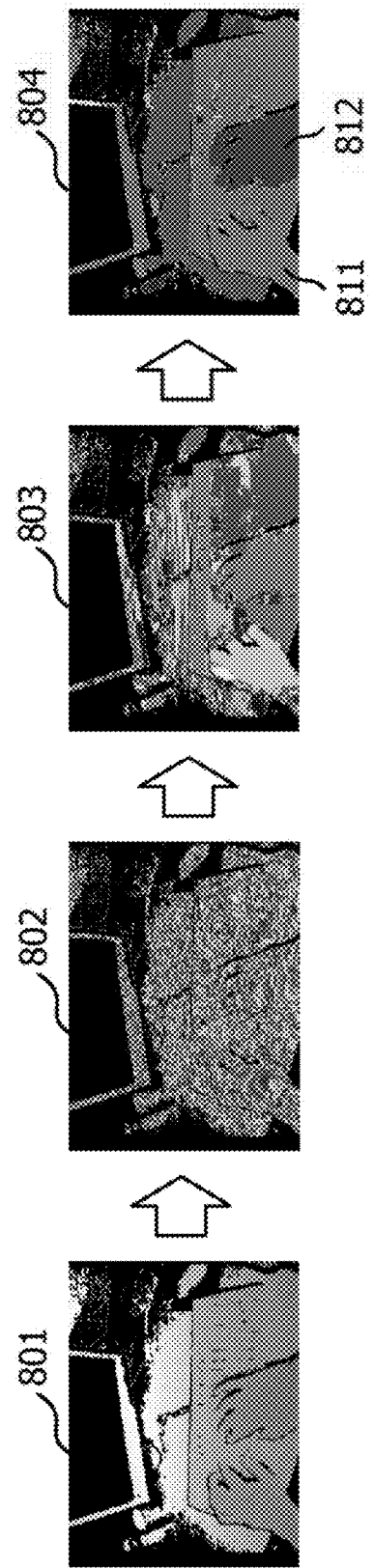
FIG. 8 illustrates the region dividing processing.

FIG. 8 illustrates an example of region dividing processing. In an initial stage of region dividing processing performed on a distance image 801, a small numbers of pixels are merged, and multiple small regions are generated as represented by a result of merging 802. Then, if the region dividing processing advances to some extent, then pixel groups are merged, and larger regions are generated as represented by a result of merging 803. Finally, the distance image 801 is divided into a plurality of regions including a left hand region 811 and a right hand region 812 as represented by a result of merging 804.

Figure 9:
FIG. 9 illustrates the region dividing processing in which likelihood-of-hand determination is omitted.

FIG. 9 illustrates an example of region dividing processing in a case where the determination of likelihood of a hand in Step 605 in FIG. 6 is omitted. In such a case, a small numbers of pixels are merged, and multiple small regions are generated inside the hand regions and the background regions as represented by a result of merging 902 in an initial stage of region dividing processing performed on a distance image 901.

If the region dividing processing advances to some extent, the pixel groups are merged, and larger regions are generated as represented by a result of merging 903. However, if the region dividing processing further advances in a case where the hands and an object of the background are located at a short distance from each other, the hand regions and the background regions are merged into one region as represented by a result of merging 904.

There is a high possibility that such a result of merging is generated if determination is made based only on the local feature in Step 604. Thus, determination based on the comprehensive feature in Step 605 is added to the region dividing processing illustrated in FIG. 6.

Figure 10:
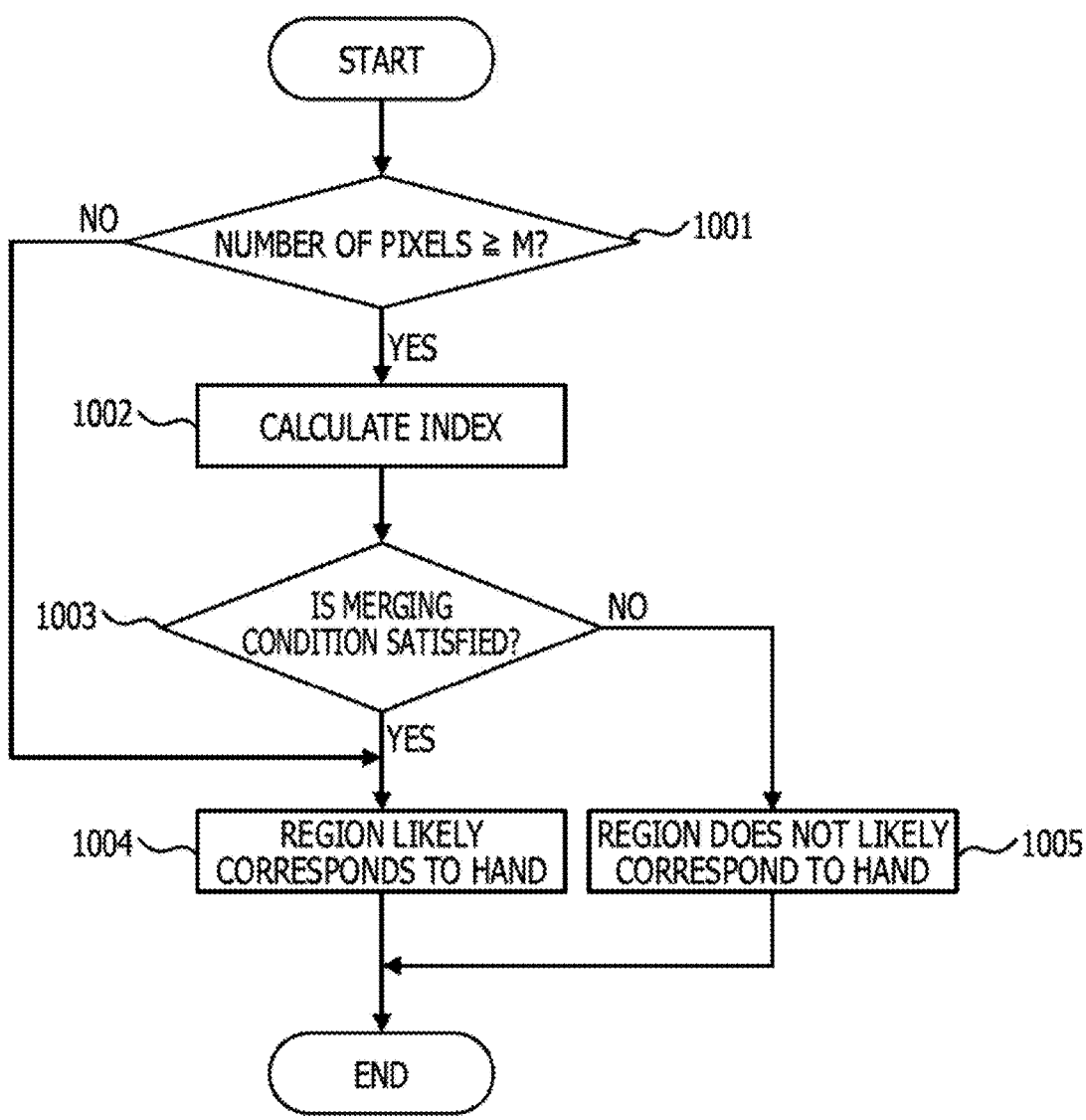
FIG. 10 is a flowchart of likelihood-of-hand determination processing.

FIG. 10 is a flowchart illustrating an example of the determination processing of likelihood of a hand in Step 605 in FIG. 6. Since the pixel groups are merged inside the hand regions and the background region as illustrated in FIG. 9 in the initial stage, the region after the merging is determined to have likelihood of a hand without any conditions in a case where the size of a region obtained by merging two pixel groups is smaller than a predetermined size. In contrast, in a case where the size of the region after the merging is equal to or greater than the predetermined size, the likelihood of a hand is determined based on the index 333.

First, the determination unit 322 compares the number of pixels in pixel groups to which the respective pixels in an adjacent pixel pair belong with a threshold value M (Step 1001). In a case where the numbers of pixels in both the pixel groups are equal to or greater than the threshold value M (YES in Step 1001), the determination unit 322 calculates the index 333 indicating likelihood of a hand of the region obtained by merging the two pixel groups (Step 1002). Then, the determination unit 322 checks whether or not the index 333 satisfies the merging condition (Step 1003).

In a case where the index 333 satisfies the merging condition (YES in Step 1003), the determination unit 322 determines that the region after the merging likely corresponds to a hand (Step 1004). In contrast, in a case where the index 333 does not satisfy the merging condition (NO in Step 1003), the determination unit 322 determines that the region after the merging does not likely correspond to a hand (Step 1005).

In a case where the number of pixels in any of the pixel groups is smaller than the threshold value M (NO in Step 1001), the determination unit 322 determines that the region after the merging likely corresponds to a hand (Step 1004).

In Step 1002, the determination unit 322 calculates the following index 333, for example.

(a) Index Indicating Planarity of Region

Planarity of a region represents whether or not a curved surface passing through a plurality of points represented by a pixel in a region is close to a plane. Surfaces of hand are roughly in the same plane in the three-dimensional space, and it is possible to separate the hand regions and an object region in the background by using that the surfaces of the hands and the surface of the object are not in the same plane.

(b) Index Indicating Contour Shape of Region

A contour shape of a region represents a shape of a contour line passing through a plurality of points represented by pixels on an outer circumference of a region. Since contour lines of the hand regions are curved lines with some roundness in many cases, it is determined that likelihood of a hand is low in a case where linearity of the contour shape is excessively high.

(c) Index Indicating Presence of Feature of Hands in Region Before and After Merging A feature of a hand in a region represents a shape of a contour line unique to a hand, such as finger tips. In a case where a contour line of some region before the merging represents a feature of a hand and a contour line of the region after the merging does not represent the feature of the hand, it is determined that the region after the merging does not likely correspond to a hand.

The determination unit 322 may determine the likelihood of a hand by using any one of the aforementioned indexes (a) to (c) or may determine the likelihood of a hand by using two or more indexes in combination.

In a case where the likelihood of a hand is determined based on planarity of a region, the determination unit 322 detects a plane from the region after the merging based on a positional relationship of points in a three-dimensional space represented by pixels included in the pixel group after the merging, for example. In such a case, a rate of points that are present in a predetermined distance from the plane from among points represented by all the pixels in the pixel group may be used as the index 333 indicating the planarity. Then, the determination unit 322 determines that the merging condition is satisfied in a case where the rate indicated by the index 333 is equal to or greater than a predetermined value, and determines that the merging condition is not satisfied in a case where the rate indicated by the index 333 is less than the predetermined value in Step 1003.

As a method of detecting the planarity from the region, a plane detection method based on Random Sample Consensus (RANSAC), a plane detection method based on three-dimensional Hough transform, a plane detection method based on labeling, or the like as disclosed in the aforementioned related art documents may be used.

According to the plane detection method based on RANSAC, three points are randomly selected from P points represented by pixels in a pixel group and, and an equation of a plane passing through the three points is calculated. Then, the number of points that are present in a predetermined distance from the plane from among the P points is counted. Such calculation of the plane and counting of points are repeated, and the equation of a plane with the largest counted number of points is employed as a result of the detection.

In a case of determining the likelihood of a hand based on a contour shape of a region, the determination unit 322 detects a straight line from the contour line based on a positional relationship of points on the contour line from among points in a three-dimensional space represented by pixels included in a pixel group after the merging, for example. As a method of detecting the straight line from the contour line, Hough transform or the like may be used.

As the index 333 indicating the contour shape, the length or the number of detected straight lines may be used. In a case of using the length of the straight lines as the index 333, the determination unit 322 determines that the merging condition is satisfied if the length indicated by the index 333 is less than a predetermined value, and determines that the merging condition is not satisfied if the length indicated by the index 333 is equal to or greater than the predetermined value in Step 1003. In a case of using the number of straight lines as the index 333, the determination unit 322 determines that the merging condition is satisfied if the number of straight lines indicated by the index 333 is less than a predetermined value, and determines that the merge condition is not satisfied if the number of straight lines indicated by the index 333 is equal to or greater than the predetermined value.

The determination unit 322 may divide the contour line into a plurality of line segments and evaluate linearity of the respective line segments, and the linearity of the respective line segments may be evaluated by using a least square method.

Figure 11:
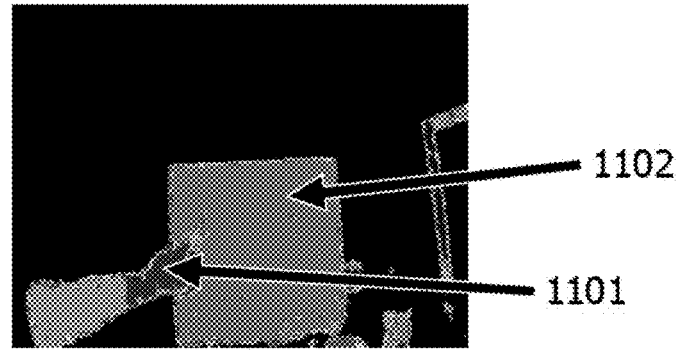
FIG. 11 illustrates a contour shape including a straight line.

FIG. 11 illustrates an example of a contour shape including a straight line. Although the shape of the contour of a region 1101 is rounded, the shape of the contour of a region 1102 has high linearity. Therefore, if the region 1101 and the region 1102 are merged, the linearity of the shape of the contour after the merging increases, and it is determined that the region does not likely correspond to a hand.

In a case of determining the likelihood of a hand based on presence of a feature of a hand in a region before and after merging, the determination unit 322 detects the feature of the hand from a contour line based on a positional relationship of points on the contour line represented by pixels included in each pixel group before and after the merging, for example. The shape of finger tips, for example, may be used as the feature of the hand, and presence of the feature of the hand in each region before and after the merging may be used as the index 333. As a method of detecting the shape of the fingertip from the contour line, a fingertip detection method disclosed in the aforementioned related art documents "Fingertip Detection for Hand Pose Recognition", "3D Finger CAPE: Clicking Action and Position Estimation under Self-Occlusions in Egocentric Viewpoint", or the like may be used.

Then, the determination unit 322 determines that the merging condition is satisfied in a case where the region after the merging includes the feature of the hand, and determines that the merging condition is not satisfied in a case where the region before the merging includes the feature of the hand and the region after the merging does not include the feature of the hand in Step 1003.

Figure 12:
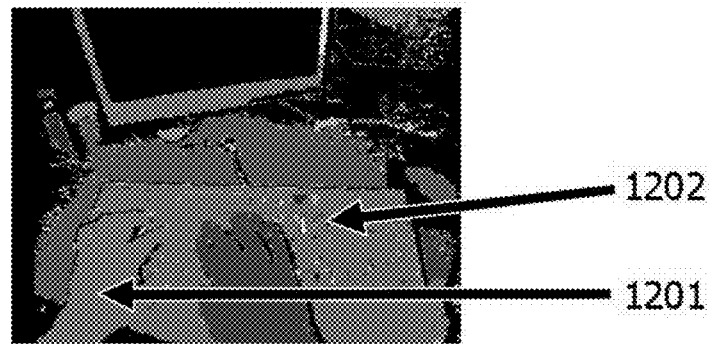
FIG. 12 illustrates a contour shape including fingertips.

FIG. 12 illustrates an example of a shape of a contour including fingertips. Although the shape of the contour of a region 1201 include the shape of the fingertips, the shape of the contour after merging does not include the shape of the fingertips if the region 1201 and a region 1202 are merged. Therefore, it is determined that the region after the merging does not likely correspond to the hand.

In Step 404 in FIG. 4, the selecting unit 113 selects, as a hand region, a region that satisfies the following conditions, for example, from among the plurality of regions generated by the dividing of the region.

(d) The number Q of pixels in a pixel group is within a predetermined range (Qmin<Q<Qmax).

(e) An average value of distances between pixels in a pixel group is within a predetermined range.

(f) A region is in contact with a lower end of the distance image.

(g) A region satisfies the merging condition used in Step 1003.

The reason of using the above condition (f) is that a hand often extends from the lower end toward an upper end of the distance image 121 in a positional relationship between the distance image sensor 302 attached to the head of the user and the user's hand in a case where the HMD apparatus is used. In the example illustrated in FIG. 8, the hand region 811 and the hand region 812 that are in contact with the lower end of the distance image 801 are selected.

The reason of using the above condition (g) is that the determination in Step 1003 is skipped in a case where the number of pixels in a pixel group before the merging is smaller than the threshold value M in Step 1001 in FIG. 10.

The selecting unit 113 may select the hand regions by using any one of the above conditions (d) to (g) alone or may select the hand regions by using two or more conditions in combination.

The configurations of the region extraction device 101 in FIG. 1 and the HMD apparatus in FIG. 3 are only examples, and a part of the components may be omitted or changed in accordance with purposes or conditions of the region extraction device 101 and the HMD apparatus. In a case where the movie information 331 is not used in the HMD apparatus in FIG. 3, for example, the imaging device 301 and the obtaining unit 311 may be omitted.

The flowcharts in FIGS. 2, 4, 6, 9, and 10 are only examples, and a part of the processing may be omitted or changed in accordance with a configuration or a condition of the region extraction device 101. In a case where the distance image 121 includes a small amount of noise in the region extraction processing in FIG. 4, for example, the processing in Step 402 may be omitted. The selecting unit 113 may select the hand regions by using conditions other than the above conditions (d) to (g) in Step 404.

In Step 1003 for the determination processing of the likelihood of a hand in FIG. 10, the determination unit 322 may determine the likelihood of a hand by using an index other than the above indexes (a) to (c).

The smoothing filter in FIG. 5, the distance image 701 in FIG. 7, the distance image 801 in FIG. 8, the distance image 901 in FIG. 9, the region 1101 and the region 1102 in FIG. 11, and the region 1201 and the region 1202 in FIG. 12 are only examples, and another smoothing filter, another distance image, and the like may be used.

The extraction target of the region extraction device 101 may be a predetermined object other than hands, such as a pen or a bar held in the user's hand. In such a case, the region extraction device 101 extracts a region of the predetermined object instead of the hand regions. The region extraction device 101 may detect that a specific operation has been performed on the HMD apparatus by recognizing motion of hands or an object based on a region extracted from a distance image, and may perform other image processing.

Figure 13:
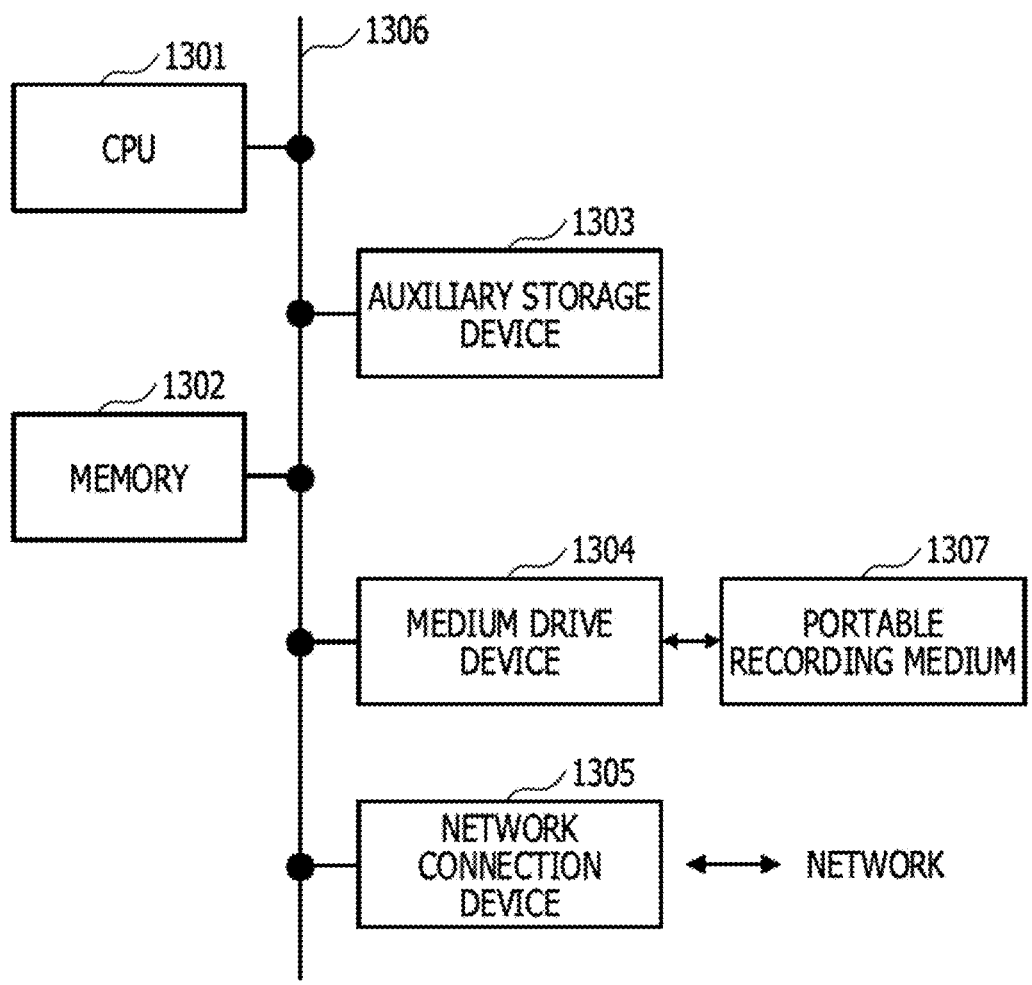
FIG. 13 is a configuration diagram of an information processing apparatus.

FIG. 13 is a configuration diagram of an information processing apparatus. The region extraction device 101 in FIGS. 1 and 3 can be realized by using the information processing apparatus (computer) as illustrated in FIG. 13, for example. The information processing apparatus in FIG. 13 includes a Central Processing Unit (CPU) 1301, a memory 1302, an auxiliary storage device 1303, a medium drive device 1304, and a network connection device 1305. These components are coupled to each other by a bus 1306.

The memory 1302 is a semiconductor memory such as a Read Only Memory (ROM), a Random Access Memory (RAM), or a flash memory and stores a program and data used for processing. The memory 1302 may be used as the storage unit 111 in FIGS. 1 and 3.

The CPU 1301 (processor) operates as the region dividing unit 112 and the selecting unit 113 in FIGS. 1 and 3 by executing the program by using the memory 1302, for example. The CPU 1301 operates as the obtaining unit 311 and the obtaining unit 312 by executing the program.

The auxiliary storage device 1303 is a magnetic disk device, an optical disc device, a magnetic-optical disk device, a tape device, or the like. The auxiliary storage device 1303 may be a hard disk drive or a flash memory. The information processing device stores a program and data in the auxiliary storage device 1303 and loads and uses the program and the data in the memory 1302. The auxiliary storage device 1303 may be used as the storage unit 111 in FIGS. 1 and 3.

The medium drive device 1304 drives a portable recording medium 1307 and accesses recorded content. The portable recording medium 1307 may be a memory device, a flexible disk, an optical disc, a magnetic-optical disk, or the like. The portable recording medium 1307 may be a Compact Disk Read Only Memory (CD-ROM), a Digital Versatile Disk (DVD), a Universal Serial Bus (USB) memory, or the like. The user may store a program and data in the portable recording medium 1307 and load and use the program and data in the memory 1302.

As described above, the computer readable recording medium that stores the program and the data used for the processing is a physical (non-transitory) recording medium such as the memory 1302, the auxiliary storage device 1303, or the portable recording medium 1307.

The network connection device 1305 is a communication interface that is coupled to a communication network such as a local area network or a wide area network and performs data transformation that accompanies communication. The information processing apparatus may receive the program and the data from an external apparatus via the network connection device 1305 and load and use the program and the data in the memory 1302.

The information processing apparatus does not necessarily include all the components in FIG. 13, and it is also possible to omit a part of the components in accordance with a purpose and a condition. In a case where communicate is not performed with another device, for example, the network connection device 1305 may be omitted. In a case where the portable recording medium 1307 is not used, the medium drive device 1304 may be omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of extracting a region in a distance image including a plurality of pixels, a pixel value of each of the plurality of pixels representing a distance, the method comprising:

for each of a plurality of adjacent pixel pairs in the distance image, comparing, by a processor, a difference between pixel values of a first pixel and a second pixel included in the respective adjacent pixel pairs with a threshold value;

selecting an adjacent pixel pair whose difference is smaller than the threshold value from among the plurality of adjacent pixel pairs;

dividing the distance image into a plurality of regions by determining whether to generate a third region represented by a third pixel group by merging a first region represented by a first pixel group including the first pixel of the selected adjacent pixel pair and a second region represented by a second pixel group including the second pixel of the selected adjacent pixel pair, based on whether the third region corresponds to a specific region having a specific shape; and selecting a region that corresponds to the specific region from among the plurality of regions.

2. The method according to claim 1, wherein the generating is not executed when it is determined that the third region does not correspond to the specific region.

3. The method according to claim 1, wherein the determining includes: determining that the first region and the second region are to be merged when a size of the third region is smaller than a predetermined size, and determining whether to merge the first region and the second region based on planarity of a curved surface represented by a plurality of points included in the third pixel group when the size of the third region is larger than the predetermined size.

4. The method according to claim 1, wherein determining includes: determining that the first region and the second region are to be merged when a size of the third region is smaller than a predetermined size, and determining whether to merge the first region and the second region based on a shape of a contour line of the third region represented by a plurality of points included in the third pixel group when the size of the third region is larger than the predetermined size.

5. The method according to claim 4, wherein the specific region is a hand region where hands are captured, and the shape of the contour line is indicated by linearity of the contour line.

6. The method according to claim 4, wherein the specific region is a hand region where hands are captured, and the determining includes determining not to merge the first region and the second region when a shape of the contour line of the first region represents features of the hands and a shape of the contour line of the third region does not represent the features of the hands.

7. The method according to claim 1, wherein the selecting selects a region that is in contact with a lower end of the distance image from among the plurality of regions as the region that corresponds to the specific region.

8. A non-transitory storage medium storing a program for causing a computer to execute a process, the computer extracting a region in a distance image including a plurality of pixels, a pixel value of each of the plurality of pixels representing a distance, the process comprising:

for each of a plurality of adjacent pixel pairs in the distance image, comparing a difference between pixel values of a first pixel and a second pixel included in the respective adjacent pixel pairs with a threshold value;

dividing the distance image into a plurality of regions by determining whether to generate a third region represented by a third pixel group by merging a first region represented by a first pixel group including the first pixel of the selected adjacent pixel pair and a second region represented by a second pixel group including the second pixel of the selected adjacent pixel pair, based on whether the third region corresponds to a specific region having a specific shape; and selecting a region that corresponds to the specific region from among the plurality of regions.

9. The storage medium according to claim 8, wherein the generating is not executed when it is determined that the third region does not correspond to the specific region.

10. The storage medium according to claim 8, wherein determining includes: determining that the first region and the second region are to be merged when a size of the third region is smaller than a predetermined size, and determining whether to merge the first region and the second region based on planarity of a curved surface represented by a plurality of points included in the third pixel group when the size of the third region is larger than the predetermined size.

11. The storage medium according to claim 8, wherein determining includes: determining that the first region and the second region are to be merged when a size of the third region is smaller than a predetermined size, and determining whether to merge the first region and the second region based on a shape of a contour line of the third region represented by a plurality of points included in the third pixel group when the size of the third region is larger than the predetermined size.

12. The storage medium according to claim 11, wherein the specific region is a hand region where hands are captured, and the shape of the contour line is indicated by linearity of the contour line.

13. The storage medium according to claim 11, wherein the specific region is a hand region where hands are captured, and the determining includes determining not to merge the first region and the second region when a shape of the contour line of the first region represents features of the hands and a shape of the contour line of the third region does not represent the features of the hands.

14. The storage medium according to claim 8, wherein the selecting selects a region that is in contact with a lower end of the distance image from among the plurality of regions as the region that corresponds to the specific region.

15. A head mounted display apparatus comprising:
a distance image sensor; and
a processor coupled to the distance image sensor and configured to:
obtain a distance image captured by the distance image sensor, the distance image including a plurality of pixels, a pixel value of each of the plurality of pixels representing a distance, for each of a plurality of adjacent pixel pairs in the distance image, compare a difference between pixel values of a first pixel and a second pixel included in the respective adjacent pixel pairs with a threshold value, divide the distance image into a plurality of regions by determining whether to generate a third region represented by a third pixel group by merging a first region represented by a first pixel group including the first pixel of the selected adjacent pixel pair and a second region represented by a second pixel group including the second pixel of the selected adjacent pixel pair, based on whether the third region corresponds to a specific region having a specific shape, and select a region that satisfies corresponds to the specific region from among the plurality of regions.

16. The head mounted display apparatus according to claim 15, wherein the determining includes: determining that the first region and the second region are to be merged when a size of the third region is smaller than a predetermined size, and determining whether to merge the first region and the second region based on planarity of a curved surface represented by a plurality of points included in the third pixel group when the size of the third region is larger than the predetermined size.

17. The head mounted display apparatus according to claim 15, wherein determining includes: determining that the first region and the second region are to be merged when a size of the third region is smaller than a predetermined size, and determining whether to merge the first region and the second region based on a shape of a contour line of the third region represented by a plurality of points included in the third pixel group when the size of the third region is larger than the predetermined size.

18. The head mounted display apparatus according to claim 17, wherein the specific region is a hand region where hands are captured, and the shape of the contour line is indicated by linearity of the contour line.

19. The head mounted display apparatus according to claim 17, wherein the specific region is a hand region where hands are captured, and the determining includes determining not to merge the first region and the second region when a shape of the contour line of the first region represents features of the hands and a shape of the contour line of the third region does not represent the features of the hands.

20. The head mounted display apparatus according to claim 15, wherein the processor is configured to select a region that is in contact with a lower end of the distance image from among the plurality of regions as the region that corresponds to the specific region.

* * * * *